US012748455B2

(12) United States Patent
Zheng et al.

(10) Patent No.: US 12,748,455 B2
(45) Date of Patent: Sep. 29, 2026

(54) IMPLEMENTING RATIONAL CLOCK CROSSING IN A DISTRIBUTED SYSTEM

(71) Applicant: International Business Machines Corporation, Armonk, NY (US)

(72) Inventors: Jie Zheng, Poughkeepsie, NY (US); Ashutosh Mishra, Poughkeepsie, NY (US); Rajat Rao, Bangalore (IN); Vesselina Papazova, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 18/943,075

(22) Filed: Nov. 11, 2024

(65) Prior Publication Data

US 2026/0133601 A1 May 14, 2026

(51) Int. Cl.
*G06F 1/10* (2006.01)

(52) U.S. Cl.
CPC .................................... *G06F 1/10* (2013.01)

(58) Field of Classification Search
CPC ........................................................ G06F 1/10
See application file for complete search history.

(56) References Cited

U.S. PATENT DOCUMENTS 7,047,508 B2 * 5/2006 Chiu .................. G06F 30/3312 716/108
7,555,089 B2 6/2009 Faulkner
8,761,327 B2 6/2014 Brouillette
9,197,397 B1 * 11/2015 Ono ...................... H04L 7/0045
10,019,170 B2 7/2018 Lee et al.
10,320,393 B2 * 6/2019 Azizi ...................... G06F 30/34
10,404,243 B2 9/2019 Hu et al.
10,902,171 B1 1/2021 Cook et al.
11,675,945 B2 6/2023 Cook et al.
11,675,959 B2 6/2023 Wachs et al.

(Continued)

OTHER PUBLICATIONS

Abdelhadi et al. "Timing-driven Variation-Aware Synthesis of Hybrid Mesh/Tree Clock Distribution Networks", Integration, theVLSI journal, 2013, 10 pages.

(Continued)

*Primary Examiner* — Nimesh G Patel
(74) *Attorney, Agent, or Firm* — Ryan, Mason & Lewis, LLP

(57) ABSTRACT

Methods, systems, and computer program products for implementing rational clock crossing in distributed systems are provided herein. A computer-implemented method includes estimating a timing budget for at least one path during rational clock crossing; maintaining at least a portion of data associated with the rational clock crossing in a first clock domain for a given number of cycles related to the estimated timing budget until a subsequent capturing edge in a second clock domain; skipping the subsequent capturing edge in the second clock domain upon determining that the subsequent capturing edge is less than the given number of cycles from at least one given launching edge in the path(s); and performing, in the path(s) and in connection with skipping the subsequent capturing edge, at least one timing adjustment from one or more launching latches in the first clock domain to one or more capturing latches in the second clock domain.

20 Claims, 6 Drawing Sheets

(56) References Cited

U.S. PATENT DOCUMENTS

| | | | |
|---|---|---|---|
| 11,764,770 B2 | 9/2023 | Gajda et al. | |
| 2008/0195884 A1* | 8/2008 | Subramanian | G06F 1/04 713/500 |
| 2008/0265957 A1 | 10/2008 | Luong et al. | |
| 2015/0347652 A1* | 12/2015 | DiLullo | G06F 30/3312 716/136 |
| 2016/0173074 A1* | 6/2016 | Chen | G11C 19/287 327/161 |
| 2016/0380748 A1* | 12/2016 | Simpson | H04L 12/40 375/359 |
| 2020/0412349 A1 | 12/2020 | Du et al. | |
| 2021/0173987 A1* | 6/2021 | Cook | G06F 30/333 |
| 2023/0308104 A1 | 9/2023 | Nelson | |
| 2024/0080178 A1 | 3/2024 | McCarthy et al. | |

OTHER PUBLICATIONS

Gholami Mohammad. "Phase Detector with Minimal Blind Zone and Reset Time for GSamples/s DLLs", Circuits Syst Signal Process, 2016, 15 pages.
Hasan et al. "All Digital Skew Tolerant Synchronous Interfacing Methods for High-Performance Point-To-Point Communications in Deep Sub-Micron SoCs", Integration, the VLSI journal, 2011, pp. 22-38.
Lodhi et al. "Timing Variation Aware Dynamic Digital Phase Detector for Low-Latency Clock Domain Crossing", IET Circuits, Devices & Systems, 2013, 7 pages.
Plassan et al. "Conclusively Verifying Clock-Domain Crossings in Very Large Hardware Designs", IEEE, 2016, 7 pages.
Sarmenta et al. "Rational Clocking", IEEE, 1995, 8 pages.

* cited by examiner

IMPLEMENTING RATIONAL CLOCK CROSSING IN A DISTRIBUTED SYSTEM

BACKGROUND

The present application generally relates to information technology and, more particularly, to processor component functionality. More specifically, the frequency of processor-generated signals is often limited by the physical design and/or configuration of the corresponding system and/or processor thereof. Conventional approaches, however, typically fail to achieve higher processor frequency values (also referred to herein as clock speeds) without incurring significant asynchronous crossing and/or latency penalties.

SUMMARY

In at least one embodiment, techniques for implementing rational clock crossing in a distributed system are provided. An example computer-implemented method can include estimating a timing budget for at least one path during rational clock crossing, and maintaining at least a portion of data associated with the rational clock crossing in a first clock domain for a given number of cycles related to the estimated timing budget until a subsequent capturing edge in a second clock domain. Additionally, the method includes skipping the subsequent capturing edge in the second clock domain upon a determination that the subsequent capturing edge is less than the given number of cycles related to the estimated timing budget from at least one given launching edge in the at least one path. Further, the method also includes performing, in the at least one path and in connection with skipping the subsequent capturing edge, at least one timing adjustment from one or more launching latches in the first clock domain to one or more capturing latches in the second clock domain.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
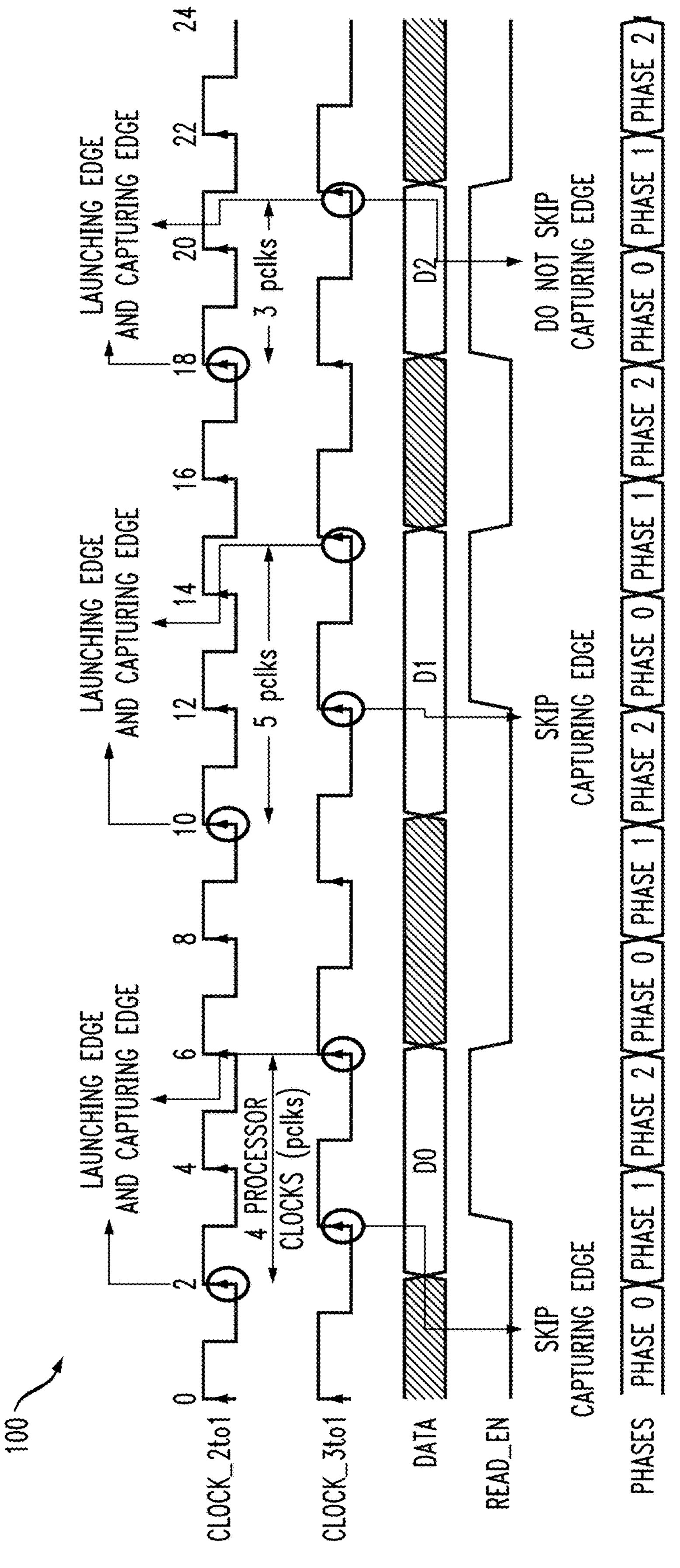
FIG. 1 is a diagram illustrating an example three processor clocks (pclks) design, according to an example embodiment of the invention.

As described herein, at least one embodiment includes implementing rational clock crossing to reduce latency for at least one interface (e.g., a high-speed interface) in a distributed system of integrated circuits (e.g., central processing units (CPUs)). Such an embodiment can include using selective clock edges to reduce latency for rational clock crossing in at least one distributed cache hierarchy system.

Accordingly, one or more embodiments include reducing and/or removing one or more restrictions posed by latency-related and/or bandwidth-related requirements by designing a system with different clocks that have a rational frequency relationship. Such an embodiment can include configuring a system to run a link at a given fraction (e.g., two-thirds) of a designated nest clock. By way merely of illustration, an example embodiment can include configuring a system to run a link at 1.8 gigahertz (GHz), two-thirds of the corresponding nest clock of 2.7 GHz. Such a configuration would result in a system which consumes only proportionately higher power but provides a significant increase in bandwidth, for example, by choosing a standard 16:1 serializer to achieve a link speed of 28.8 GHz.

As also detailed herein, integrated circuit selections can have implications on the packing of data to be sent over a link. For example, because a cache line is 256 bytes, a multiple of 16, choosing a power-of-two serialization ratio can be more advantageous for faster packet processing with a rational clock instead of choosing a power-of-two synchronized clock with a non-power-of-two serialization ratio.

As used herein, "core clock" or "processor clock" refer to a signal which drives a CPU core and defines the CPU speed. Also, "nest clock" refers to a lower-frequency clock that coordinates shared resources (such as, e.g., memory controllers, L3 caches, etc.) and communication between a CPU and one or more other system components. Additionally, as used herein, a "DLL clock" refers to a data link layer (DLL) clock, wherein a data link layer is responsible for managing how data is framed and transmitted across a physical link (e.g., a link between processors). Further, a "power-of-two clock" refers to a ratio between clocks that is a multiple of two (e.g., a 10 GHz clock versus a 5 GHz clock), and a "rational clock" refers to a ratio between two clocks which is not multiple of two (e.g., a 9 GHz clock versus a 3 GHz clock). Also, as used herein, a 2.7 GHz rational clock and a 1.8 GHz rational clock are referred to as clock_2to1 and clock_3to1, respectively.

One or more embodiments include implementing methods based at least in part on timing budget to reduce latency without adding staging delays when the corresponding rational clocks are used in a system. For a system wherein the core clock is 5.4 GHz, one processor clock is its clock period of 185.185 picoseconds (ps). Further, for a system wherein the rational clocks are 2.7 GHz (also referred to herein as clock_2to1) and 1.8 GHz (also referred to herein as clock_3to1), the clock periods are 370.370 ps and 555.556 ps, respectively.

Based at least in part on the complexity of the logic and wiring delay between two rational clocks, at least one embodiment can include selecting 370.370 ps, or two processor clocks, as the timing budget between the rational clocks. Additionally or alternatively, at least one embodiment can include selecting 555.556 ps, or three processor clocks, as the timing budget between the rational clocks.

As used herein, a timing budget refers to the allocation of time required for a signal to propagate from the launching latch to the input of the capturing latch, while meeting one or more timing constraints (e.g., setup, hold time, etc.) such that there is no timing violation in the design. Additionally, setup time refers to the minimum amount of time that the signal input to the capturing latch needs to be stable before capturing a clock edge, and hold time refers to the minimum duration that the signal must be stable after the clock edge at the capturing latch to ensure a correct capture. Also, a data propagation delay, as used herein, refers to the amount of time needed for a signal to travel from the launching latch through the combinational logic, including delays through wire, logic gates and any buffering in the path, and accounting for clock skew and clock jitter.

Accordingly, as detailed herein, one or more embodiments include ensuring that when a capturing edge is used, the minimum time between a launching edge and a capturing edge meets the timing budget. If a capturing edge would not satisfy such timing requirements, that capturing edge will be skipped. In such an embodiment, a clock phase detector can be used to determine which edge needs to be skipped.

Further, in one or more embodiments, at least one clock phase detector can be implemented to ensure that data is held stable for a given period of time (e.g., a minimum of two processor clocks or three processor clocks, as necessary) based at least in part on the system design, before capturing at least one clock edge.

Accordingly, and as further detailed herein, one or more embodiments include eliminating an undesired staging delay when data is launched from clock_2to1 and captured at clock_3to1. Such an embodiment can also include using at least one phase detector between two rational clocks to ensure data launching meets one or more timing requirements when captured by a receiving clock, and applying one or more timing adjustments on such paths.

More particularly, when a rational clock is used to meet a system's power budget, and a one processor clock timing budget is not sufficient to cover the wire and logic delays, an undesired staging delay is often introduced to avoid timing violations and timing complexities. As such, at least one embodiment includes implementing methods based at least in part on timing budgets to reduce latency without adding staging delays when the rational clocks are used in a system.

In such an embodiment, at least one phase detector is used to detect at least one phase relationship between two rational clocks. More particularly, in one or more embodiments, there can be three different phases between clock_2to1 and clock_3to1. When clock_2to1 and clock_3to1 rising edges align, such an embodiment includes referring to this period of clock_2to1 as Phase0. When a rising edge of clock_3to1 falls in the middle of the period of clock_2to1, such an embodiment includes referring to this period of clock_2to1 as Phase1. When an ending of the clock_3to1 and clock_2to1 period coincides, such an embodiment includes referring to this period of clock_2to1 as Phase2.

As used herein, a "rising edge" refers to the transition/edge of the clock signal from low to high. Often, for example, the rising edge can be used to trigger data transitions for latches (e.g., capturing the data into the latch, launching and/or sending out the data from the latch, etc.). Also, a "launching edge" refers to the clock edge where data is being sent out from a latch. In one or more embodiments, a launching edge can be a rising edge or a falling edge (i.e., a clock transition from high to low), and in particular implementations detailed herein, a rising edge is used to send out data from a latch. Further, as used herein, a "capturing edge" refers to the clock edge where data is captured, latched and/or stored at the destination latch. In one or more embodiments, a capturing edge can be a rising edge or a falling edge, and in particular implementations detailed herein, a rising edge is used as the capturing edge.

As further detailed in connection with FIG. 1 through FIG. 5, one or more embodiments include estimating the timing budget required for one or more paths during rational clock crossing (e.g., two pclks or three pclks), holding corresponding data stable in launching a rational clock domain (e.g., clock_2to1) for at least a given processor clock value (e.g., a minimum of three pclks) until the next selected capturing edge in capturing a rational clock domain (e.g., clock_3to1). Such an embodiment can also include skipping a capturing edge in capturing a rational clock domain (e.g., clock_3to1) if the capturing edge is less than at least a given processor clock value (e.g., three pclks) aways from the launching edge. Further, such an embodiment can include implementing a given timing adjustment (e.g., a two pclks timing adjustment from launching latches that operate under clock_2to1 to capturing latches that operate under clock_3to1) in one or more timing paths. As used herein, latches refer to one or more storage devices which store and/or hold the digital data in question. Also, in one or more embodiments, a clock edge is used to trigger a latch to capture new data and/or send out data it is holding. Accordingly, as used herein, a clock edge refers to the clock transition between low to high or high to low. A low to high transition is associated with a rising edge, and a high to low transition is associated with a falling edge.

FIG. 1 is a diagram illustrating an example three pclks design 100, according to an example embodiment of the invention. By way of illustration, FIG. 1 depicts an embodiment wherein one 1 pclk represents the shortest timing between a launching edge and a capturing edge during the rational clock crossing. Additionally, such an embodiment as depicted in FIG. 1 includes using three pclks as the timing budget.

More particularly, FIG. 1 depicts an example embodiment which includes holding data stable in the launching 2:1 clock domain for a minimum of three pclks until the next selected capturing edge in the capturing 2:1 clock domain. Such an embodiment also includes skipping a capturing edge in a capturing 3:1 clock domain if the capturing edge is less than three pclks away from the launching edge. Further, a two pclks timing adjustment can be implemented from the launching 2:1 clock domain to the capturing 3:1 clock domain.

Additionally, in the example embodiment depicted in FIG. 1, a phase detector can be used to determine which launching 2:1 clock edge the data is launching from relative to a capturing 3:1 clock edge. The phase detector can also be used to determine which 3:1 clock capturing edge needs to be skipped and which 3:1 clock capturing edge needs to be selected for data capturing.

As also depicted in FIG. 1, the example embodiment can include driving a read enable (read_en) signal in the next 3:1 clock edge if data is available in Phase1, if data is available in Phase2, or if data is being written in Phase2. More particularly, if data is available in Phase1, one or more embodiments can include using a control (CTRL) signal from a 2:1 clock domain such as, e.g., data_available, in Phase1 to drive a read enable signal in a 3:1 clock domain using the following 3:1 clock edge, and using one pclk timing for the CTRL signal in Phase1 from the 2:1 clock domain to drive a read enable signal in a 3:1 clock domain. If data is available in Phase2, at least one embodiment includes using a CTRL signal in Phase2 from the 2:1 clock domain to drive a read enable signal in the 3:1 clock domain using the following 3:1 clock edge, and using one pclk timing for the CTRL signal in Phase2 to drive a read enable signal in the 3:1 clock domain. If data will be available in Phase0, one or more embodiments can include using a CTRL signal from a 2:1 clock domain (e.g., a write enable signal) in the current phase (e.g., Phase2) to drive a read enable signal in a 3:1 clock domain using the following 3:1 clock edge, and using one pclk timing for the CTRL signal from Phase2 to drive a read enable signal in the 3:1 clock domain. Also, in accordance with such an embodiment, by skipping the capturing edge, the timing between the launching edge and the capturing edge is 3 pclks, 4 pclks and 5 pclks, which satisfies the 3 pclks timing budget because the data will be held stable for a minimum of 3 pclks before the capturing edge.

In connection with the example embodiment depicted in FIG. 1, data is launched from clock_2to1 and captured in clock_3to1, and the timing budget is three processor clocks, or 555.556 ps. In such an embodiment, the launching register from clock_2to1 needs to ensure that data is stable for a minimum of three processor clocks before the next capturing edge of the clock_3to1 domain. Such an example embodiment includes using four entries buffer under the clock_2to1 domain, wherein the four entries are multiplexed with at least one read pointer as a select signal to the multiplexer that is under the clock_3to1 domain. A benefit of using a clock_3to1 select signal includes the ability to switch data at a three processor clock interval. Also, in one or more embodiments at least one buffer credit can be used to ensure that the user does not overrun the four entries buffer.

Additionally, in such an embodiment, a read enable signal from the clock_3to1 domain is asserted when the next data in the entry to be selected can be guaranteed to be stable for a minimum of three processor clocks. To accomplish that, a write enable signal during Phase2 can be used to feed a read enable signal in the clock_3to1 domain, and one processor clock timing can be used between the write enable and read enable signal. Further, a write pointer and a read pointer can be used to generate a buffer not empty signal, and to then feed the read enable signal in the clock_3to1 domain as well. One processor clock timing can also be used between the write pointer and the read enable signal. To ensure that the user of the buffer does not overrun the buffer, the read enable signal is fed into the credit return signal in the clock_2to1 domain using one processor clock timing. The credit return signal is then qualified with Phase1 and Phase2 before sending the signal back to the user of the buffer.

Figure 2:
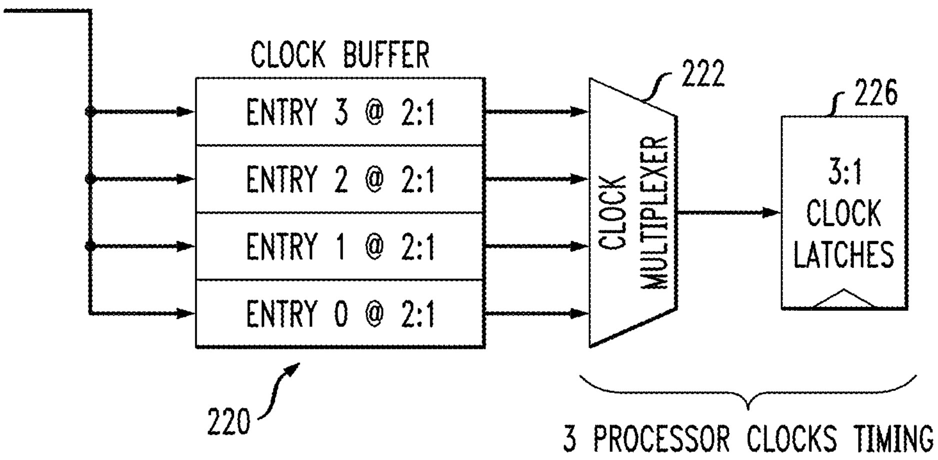
FIG. 2 is a diagram illustrating an example structure for implementing a three pclks design, according to an example embodiment of the invention.

FIG. 2 is a diagram illustrating an example structure for implementing a three pclks design, according to an example embodiment of the invention. By way of illustration, FIG. 2 depicts using a three pclks timing budget between a 2:1 clock buffer 220 and 3:1 clock latches 226. The 2:1 clock buffer 220 can include four buffer entries in connection with a 3:1 clock multiplexer (MUX) 222.

Additionally, such an embodiment can also include using a clock phase detector. More particularly, in such an embodiment, the clock phase detector generates three signals (i.e., Phase0, Phase1, and Phase2 signals) such as shown, for example, in FIG. 1 and FIG. 3. Also, these three signals are used to determine which phases are presently active relative to clock_2to1 and clock_3to1, and to determine if an edge needs to be skipped. In a rational clock context with 2:1 and 3:1 non-power-two synchronized clocks, the three phases will be repeated. A different ratio could produce more and/or different phases from the clock phase detector. Accordingly, as detailed herein, one or more embodiments include using a clock phase detector to determine which clock edge to skip during rational clock crossing.

Figure 3:
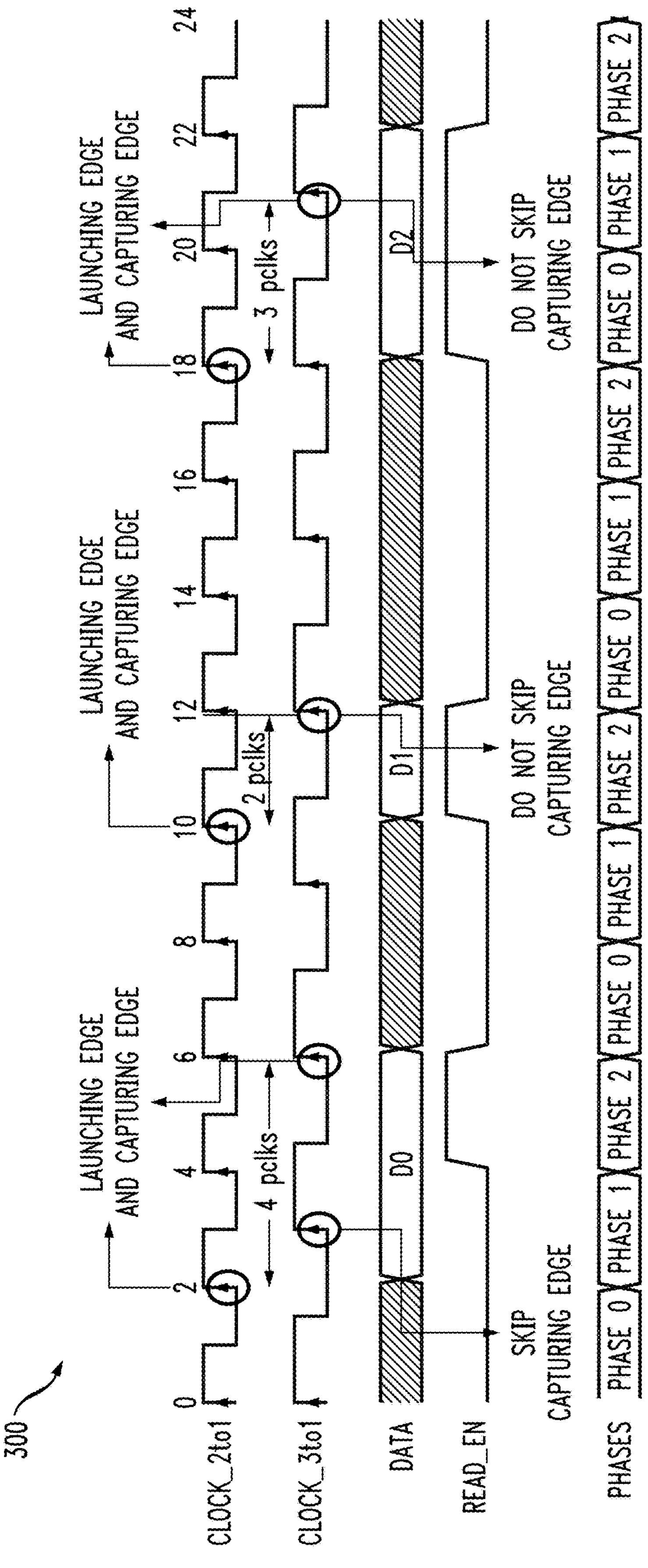
FIG. 3 is a diagram illustrating an example two pclks design, according to an example embodiment of the invention.

FIG. 3 is a diagram illustrating an example two pclks design 300, according to an example embodiment of the invention. By way of illustration, FIG. 3 depicts an embodiment using a two pclks timing budget. More particularly, FIG. 3 depicts an example embodiment which includes holding data stable in a 2:1 clock domain for a minimum of two pclks until the next selected capturing edge in a 3:1 clock domain. Such an embodiment also includes skipping a capturing edge in a 3:1 clock domain if the capturing edge is less than two pclks away from the launching edge. Further, a one pclk timing adjustment can be implemented in the path where data launched from a 2:1 clock domain (e.g., launching latches) and captured in a 3:1 clock domain (e.g., capturing latches) in one or more critical timing paths.

In such an embodiment, two pclks is the shortest timing between a launching edge and a capturing edge. Further, such an embodiment can include driving a read enable signal in a 2:1 clock cycle when data is available during Phase2, as well as driving a read enable signal in two 2:1 clock cycles when data is available during Phase0. Additionally, in such an embodiment, by skipping the capturing edge, the timing between the launching edge and the capturing edge is two pclks, three pclks and four pclks, which satisfies the two pclks timing budget because the data will be held stable for a minimum of two pclks before the capturing edge.

In connection with the example embodiment depicted in FIG. 3, data is launched from clock_2to1 and captured in clock_3to1, while the timing budget is two processor clocks, or 370.370 ps. Also, in such an embodiment, the launching register from clock_2to1 needs to ensure that data is stable for a minimum of two processor clocks before the next capturing edge of the clock_3to1 domain. Such an embodiment can include using four entries via a shifting first in, first out (FIFO) protocol under a clock_2to1 domain, wherein a benefit of using a shifting FIFO protocol includes avoiding additional latency through the entries multiplexing at the output of a buffer given that timing budget is two processor clocks (e.g., instead of three processor clocks). In the shifting FIFO design, if a pop signal from the clock_2to1 domain is received, entry0 is captured into the clock_3to1 domain, entry1 shifts into entry0, entry2 shifts into entry1, entry3 shifts into entry2, and entry3 becomes an available entry. To ensure that entry0 remains stable for a minimum of two processor clocks, the pop signal is only asserted during Phase1 and Phase2 when a read enable signal is asserted.

Additionally, FIFO credit can be used to ensure that the user does not overrun the four entries, and the credit can be returned to the user during the same cycle as the assertion of the pop signal. A read enable signal from clock_2to1 can be driven at the same time as entry0 became available, and the corresponding value can be held until after the FIFO mechanism becomes empty. To avoid new data showing up at entry0 during Phase1 when FIFO switches from empty to not empty, which would cause only one processor clock of entry0 stable time before the next capturing edge of the clock_3to1 domain, logic ensures no read enable signal is asserted during Phase1 if the FIFO mechanism was empty in the previous cycle.

If the new entry0 data became available during Phase0, the entry0 data and the read enable signal would be held stable during Phase0 and Phase1, or four processor clocks before the pop signal was asserted during Phase1. If the new entry0 data became available during Phase2, then the read enable signal along with the pop signal can be asserted in the current cycle, and a minimum of two processor clocks is allowed before the next capturing edge of the clock_3to1 domain. If the new entry0 data became available during Phase1, then the read enable signal is deferred to the next clock_2to1 clock or Phase2 to avoid one processor clock timing before the next capturing edge of the clock_3to1 domain.

Figure 4:
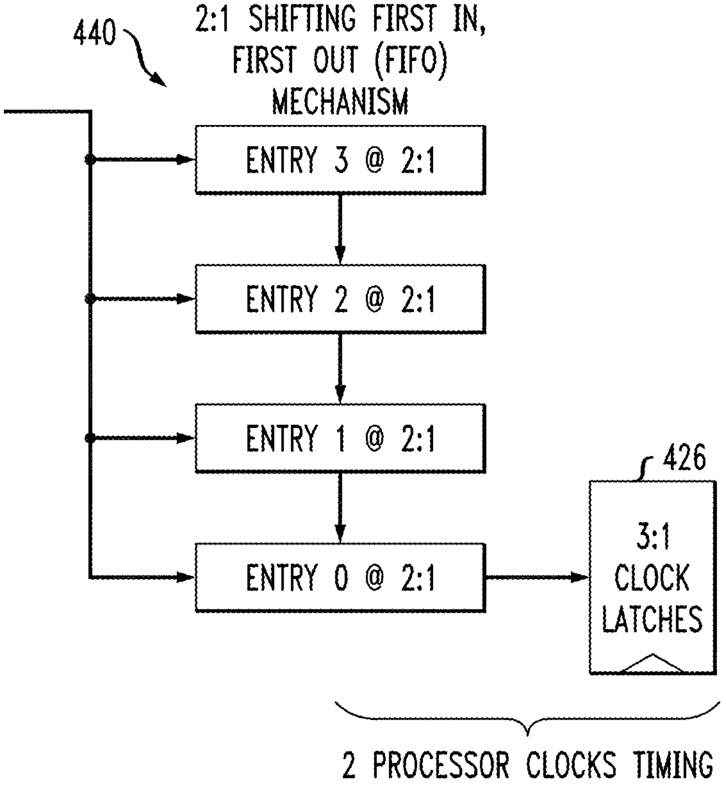
FIG. 4 is a diagram illustrating an example structure for implementing a two pclks design, according to an example embodiment of the invention.

FIG. 4 is a diagram illustrating an example structure for implementing a two pclks design, according to an example embodiment of the invention. By way of illustration, FIG. 4 depicts using a two pclks timing budget between a 2:1 shifting FIFO mechanism 440 and 3:1 clock latches 426. The 2:1 shifting FIFO mechanism 440 can include four entries. Additionally, such an embodiment can also include using a clock phase detector, as further detailed herein.

Figure 5:
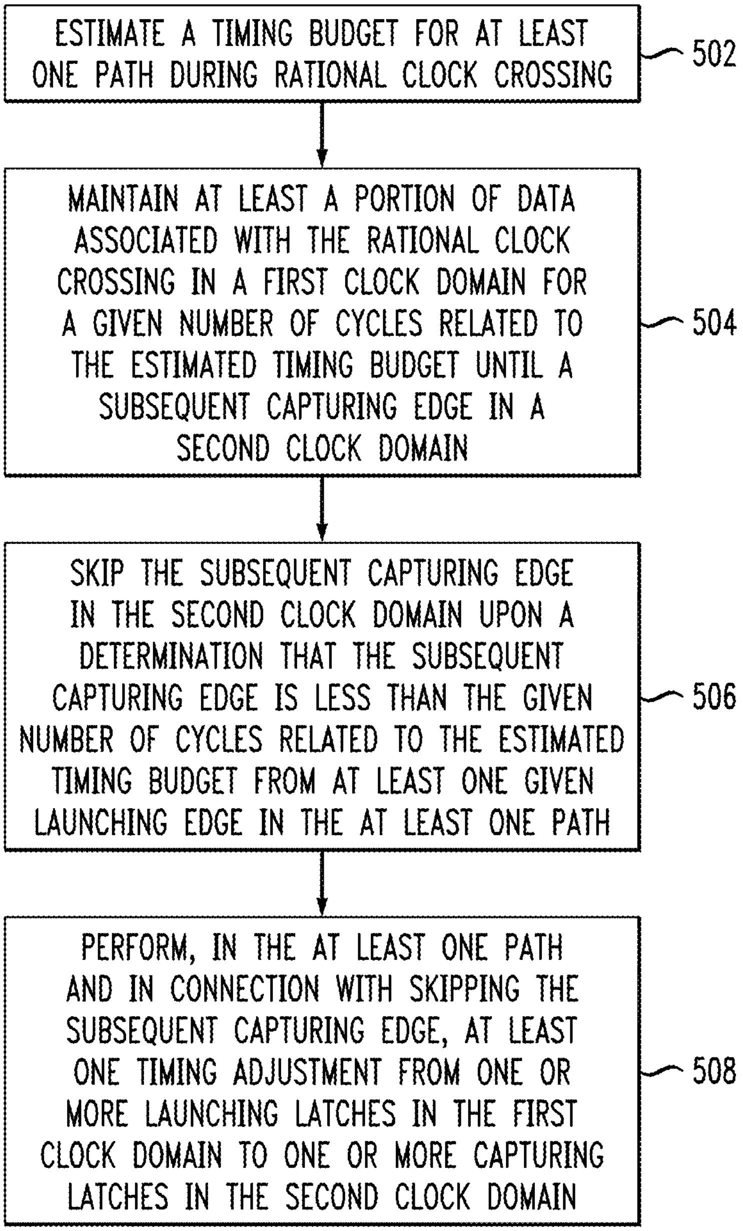
FIG. 5 is a flow diagram illustrating techniques according to an example embodiment of the invention.

FIG. 5 is a flow diagram illustrating techniques according to an embodiment of the present invention. Step 502 includes estimating a timing budget for at least one path during rational clock crossing. In at least one embodiment, the at least one path includes a 2:1 clock domain to a 3:1 clock domain. Also, estimating a timing budget for at least one path during rational clock crossing can include estimating a two processor clocks timing budget for the at least one path during rational clock crossing. Additionally or alternatively, estimating a timing budget for at least one path during rational clock crossing can include estimating a three processor clocks timing budget for the at least one path during rational clock crossing.

Step 504 includes maintaining at least a portion of data associated with the rational clock crossing in a first clock domain for a given number of cycles related to the estimated timing budget until a subsequent capturing edge in a second clock domain. In one or more embodiments, maintaining at least a portion of data associated with the rational clock crossing in a first clock domain for a given number of cycles related to the estimated timing budget until a subsequent selected capturing edge in a second clock domain includes maintaining the at least a portion of data associated with the rational clock crossing in a 2:1 clock domain for a given number of cycles related to the estimated timing budget until a subsequent selected capturing edge in a 3:1 clock domain. Additionally or alternatively, maintaining at least a portion of data associated with the rational clock crossing in a first clock domain for a given number of cycles related to the estimated timing budget until a subsequent selected capturing edge in a second clock domain can include maintaining the at least a portion of data associated with the rational clock crossing in the first clock domain for a minimum of one of two processor clocks and three processor clocks until a subsequent selected capturing edge in the second clock domain.

Step 506 includes skipping the subsequent capturing edge in the second clock domain upon a determination that the subsequent capturing edge is less than the given number of cycles related to the estimated timing budget from at least one given launching edge in the at least one path. In one or more embodiments, skipping the subsequent capturing edge in the second clock domain includes using at least one phase detector to dynamically determine that the subsequent capturing edge is less than the given number of cycles related to the estimated timing budget from the at least one given launching edge in the at least one path.

Further, in at least one embodiment, skipping the subsequent capturing edge in the second clock domain includes skipping the subsequent capturing edge in a 3:1 clock domain upon a determination that the subsequent capturing edge is less than the given number of cycles related to the estimated timing budget from the at least one given launching edge in the at least one path. Additionally or alternatively, skipping the subsequent capturing edge in the second clock domain can include skipping the subsequent capturing edge upon a determination that the subsequent capturing edge is less than a minimum of one of two processor clocks and three processor clocks from the at least one given launching edge in the at least one path.

Step 508 includes performing, in the at least one path and in connection with skipping the subsequent capturing edge, at least one timing adjustment from one or more launching latches in the first clock domain to one or more capturing latches in the second clock domain. In one or more embodiments, performing at least one timing adjustment includes performing at least one timing adjustment from one or more launching latches in a 2:1 clock domain to one or more capturing latches in a 3:1 clock domain. Additionally or alternatively, performing at least one timing adjustment can include performing at least one timing adjustment of one of two processor clocks and three processor clocks from the one or more launching latches in the first clock domain to the one or more capturing latches in the second clock domain.

In at least one embodiment, the techniques depicted in FIG. 5 can also include determining, using at least one phase detector, one or more portions of edge data in the first clock domain launching relative to at least one clock in the second clock domain.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as rational clock crossing code 626. In addition to rational clock crossing code 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and rational clock crossing code 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Figure 6:
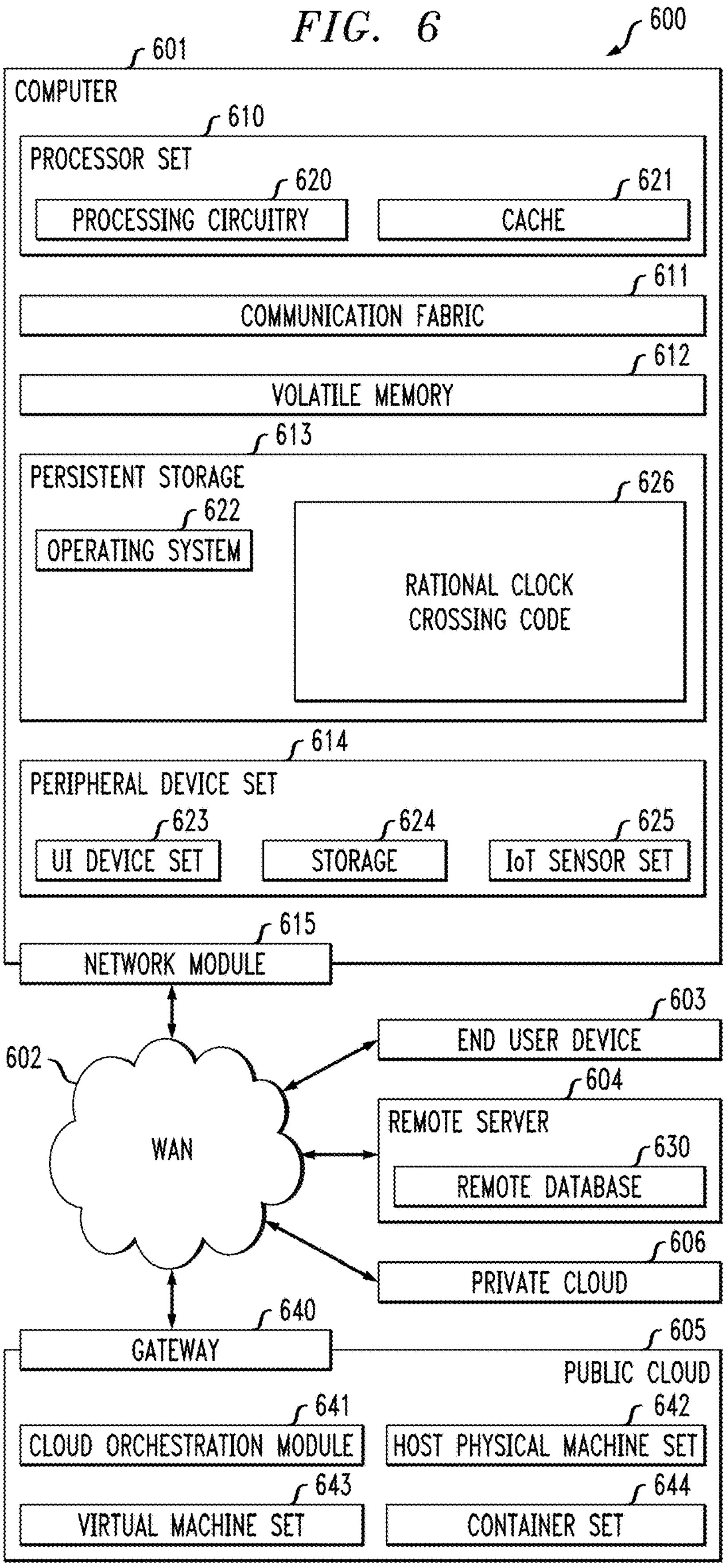
FIG. 6 is a diagram illustrating a computing environment in which at least one embodiment of the invention can be implemented.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in rational clock crossing code 626 in persistent storage 613.

Communication fabric 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type RAM or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a ROM, but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in rational clock crossing code 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

In computing environment 600, computer 601 is shown as being connected to the internet (see WAN 602). However, in many embodiments of the present invention computer 601 will be isolated from communicating over communications network and not connected to the internet, running as a standalone computer. In these embodiments, network module 615 of computer 601 may not be necessary or even desirable in order to ensure isolation and to prevent external communications coming into computer 601. The standalone computer embodiments are potentially advantageous, at least in some applications of the present invention, because they are typically more secure. In other embodiments, computer 601 is connected to a secure WAN or a secure LAN instead of WAN 602 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:

a memory configured to store program instructions; and a processor operatively coupled to the memory to execute the program instructions to:

estimate a timing budget for at least one path during rational clock crossing;

maintain at least a portion of data associated with the rational clock crossing in a first clock domain for a given number of cycles related to the estimated timing budget until a subsequent capturing edge in a second clock domain;

skip the subsequent capturing edge in the second clock domain upon a determination that the subsequent capturing edge is less than the given number of cycles related to the estimated timing budget from at least one given launching edge in the at least one path; and perform, in the at least one path and in connection with skipping the subsequent capturing edge, at least one timing adjustment from one or more launching latches in the first clock domain to one or more capturing latches in the second clock domain.

2. The system of claim 1, wherein skipping the subsequent capturing edge in the second clock domain comprises using at least one phase detector to dynamically determine that the subsequent capturing edge is less than the given number of cycles related to the estimated timing budget from the at least one given launching edge in the at least one path.

3. The system of claim 1, wherein the at least one path comprises a 2:1 clock domain to a 3:1 clock domain.

4. The system of claim 1, wherein estimating a timing budget for at least one path during rational clock crossing comprises estimating a two processor clocks timing budget for the at least one path during rational clock crossing.

5. The system of claim 1, wherein estimating a timing budget for at least one path during rational clock crossing comprises estimating a three processor clocks timing budget for the at least one path during rational clock crossing.

6. The system of claim 1, wherein maintaining at least a portion of data associated with the rational clock crossing in a first clock domain for a given number of cycles related to the estimated timing budget until a subsequent selected capturing edge in a second clock domain comprises maintaining the at least a portion of data associated with the rational clock crossing in a 2:1 clock domain for a given number of cycles related to the estimated timing budget until a subsequent selected capturing edge in a 3:1 clock domain.

7. The system of claim 1, wherein maintaining at least a portion of data associated with the rational clock crossing in a first clock domain for a given number of cycles related to the estimated timing budget until a subsequent selected capturing edge in a second clock domain comprises maintaining the at least a portion of data associated with the rational clock crossing in the first clock domain for a minimum of one of two processor clocks and three processor clocks until a subsequent selected capturing edge in the second clock domain.

8. The system of claim 1, wherein skipping the subsequent capturing edge in the second clock domain comprises skipping the subsequent capturing edge in a 3:1 clock domain upon a determination that the subsequent capturing edge is less than the given number of cycles related to the estimated timing budget from the at least one given launching edge in the at least one path.

9. The system of claim 1, wherein skipping the subsequent capturing edge in the second clock domain comprises skipping the subsequent capturing edge upon a determination that the subsequent capturing edge is less than a minimum of one of two processor clocks and three processor clocks from the at least one given launching edge in the at least one path.

10. The system of claim 1, wherein performing at least one timing adjustment comprises performing at least one timing adjustment from one or more launching latches in a 2:1 clock domain to one or more capturing latches in a 3:1 clock domain.

11. The system of claim 1, wherein performing at least one timing adjustment comprises performing at least one timing adjustment of one of two processor clocks and three processor clocks from the one or more launching latches in the first clock domain to the one or more capturing latches in the second clock domain.

12. The system of claim 1, wherein the processor is further operatively coupled to the memory to execute the program instructions to:

determine, using at least one phase detector, one or more portions of edge data in the first clock domain launching relative to at least one clock in the second clock domain.

13. A computer program product comprising a computer readable storage medium having program instructions embodied therewith, the program instructions executable by a computing device to cause the computing device to:

estimate a timing budget for at least one path during rational clock crossing;

maintain at least a portion of data associated with the rational clock crossing in a first clock domain for a given number of cycles related to the estimated timing budget until a subsequent capturing edge in a second clock domain;

skip the subsequent capturing edge in the second clock domain upon a determination that the subsequent capturing edge is less than the given number of cycles related to the estimated timing budget from at least one given launching edge in the at least one path; and perform, in the at least one path and in connection with skipping the subsequent capturing edge, at least one timing adjustment from one or more launching latches in the first clock domain to one or more capturing latches in the second clock domain.

14. The computer program product of claim 13, wherein estimating a timing budget for at least one path during rational clock crossing comprises estimating a two processor clocks timing budget for the at least one path during rational clock crossing.

15. The computer program product of claim 13, wherein estimating a timing budget for at least one path during rational clock crossing comprises estimating a three processor clocks timing budget for the at least one path during rational clock crossing.

16. The computer program product of claim 13, wherein skipping the subsequent capturing edge in the second clock domain comprises using at least one phase detector to dynamically determine that the subsequent capturing edge is less than the given number of cycles related to the estimated timing budget from the at least one given launching edge in the at least one path.

17. A computer-implemented method comprising:

estimating a timing budget for at least one path during rational clock crossing;

maintaining at least a portion of data associated with the rational clock crossing in a first clock domain for a given number of cycles related to the estimated timing budget until a subsequent capturing edge in a second clock domain;

skipping the subsequent capturing edge in the second clock domain upon a determination that the subsequent capturing edge is less than the given number of cycles related to the estimated timing budget from at least one given launching edge in the at least one path; and performing, in the at least one path and in connection with skipping the subsequent capturing edge, at least one timing adjustment from one or more launching latches in the first clock domain to one or more capturing latches in the second clock domain;

wherein the method is carried out by at least one computing device.

18. The computer-implemented method of claim 17, wherein estimating a timing budget for at least one path during rational clock crossing comprises estimating a two processor clocks timing budget for the at least one path during rational clock crossing.

19. The computer-implemented method of claim 17, wherein estimating a timing budget for at least one path during rational clock crossing comprises estimating a three processor clocks timing budget for the at least one path during rational clock crossing.

20. The computer-implemented method of claim 17, wherein skipping the subsequent capturing edge in the second clock domain comprises using at least one phase detector to dynamically determine that the subsequent capturing edge is less than the given number of cycles related to the estimated timing budget from the at least one given launching edge in the at least one path.

* * * * *